United States Patent
Lehtinen et al.

[11] Patent Number: 5,980,649
[45] Date of Patent: Nov. 9, 1999

[54] METHOD AND APPARATUS FOR WASHING VEHICLES

[75] Inventors: Eero Lehtinen, Siivikkala; Raimo Vesa, Tampere; Esa Syvälahti, Nokia, all of Finland

[73] Assignee: Tammermatic Oy, Tampere, Finland

[21] Appl. No.: 08/912,808

[22] Filed: Aug. 19, 1997

[30] Foreign Application Priority Data

Aug. 28, 1996 [FI] Finland .................................... 963359

[51] Int. Cl.⁶ ............................. B08B 1/02; B08B 3/02; B08B 3/04
[52] U.S. Cl. ............................... 134/36; 134/26; 134/32; 134/123; 134/99.2
[58] Field of Search ................... 134/32, 26, 36, 134/123, 99.2

[56] References Cited

U.S. PATENT DOCUMENTS

| | | | |
|---|---|---|---|
| 3,447,505 | 6/1969 | Wagner | 134/99.2 |
| 3,595,268 | 7/1971 | Archer | 134/99.2 |
| 3,904,115 | 9/1975 | Adams | 239/8 |
| 4,711,257 | 12/1987 | Kobayashi | 134/56 R |
| 4,852,593 | 8/1989 | Daugherty | 134/94 |
| 5,280,855 | 1/1994 | Rietsch, Jr. | 134/123 X |
| 5,482,212 | 1/1996 | Kobryn et al. | 239/227 |
| 5,853,494 | 12/1998 | Andersson | 134/10 |

FOREIGN PATENT DOCUMENTS 924 420   4/1994   Finland .
38 14 726 11/1989  Germany .

OTHER PUBLICATIONS

European Search Report issued in corresponding Application No. EP 97 66 0090.

*Primary Examiner*—Zeinab El-Arini
*Attorney, Agent, or Firm*—Burns, Doane, Swecker & Mathis, L.L.P.

[57] ABSTRACT

The invention relates to a method and an apparatus for washing vehicles. According to the invention, wax is sprayed to the surface of a vehicle during high-pressure washing of the vehicle. This improves the drying result, and allows the wax to be applied efficiently to the vehicle surface. The washing operation is simple and rapid.

6 Claims, 1 Drawing Sheet

METHOD AND APPARATUS FOR WASHING VEHICLES

BACKGROUND OF THE INVENTION

1. Field of the Invention

The invention relates to a method for washing vehicles, said method comprising washing a vehicle with an apparatus comprising a frame, said frame and the vehicle to be washed moving in relation to each other in the longitudinal direction of the vehicle, whereby the vehicle is washed with a high pressure water jet, waxed, and dried.

The invention further relates to an apparatus for washing vehicles, said apparatus comprising a frame, said frame and the vehicle to be washed being arranged to move in relation to each other in the longitudinal direction of the vehicle, and spray nozzles arranged to spray high-pressure water for cleaning the vehicle.

2. Description of Related Art

A brushless vehicle washing apparatus, i.e. a washing apparatus in which a vehicle is washed by water jets directed to it, typically operates as described in the following paragraph.

The first step comprises preliminary washing, in which a detergent is sprayed to the surface of the vehicle. The following step comprises high-pressure washing, in which high-pressure water jets are directed to the vehicle for cleaning it and for rinsing off the detergent. Subsequently the vehicle is rinsed with low-pressure water, to which wax can be added, and finally the vehicle is dried. Such a method and apparatus are disclosed, for example, in Fl 924 420. The washing may also comprise other steps according to the need. It is possible to add wax, for example, in several steps, depending on whether hot wax and/or rinsing aid is used. In all these cases the problem is, however, that the wax easily remains on the surface of the water which exists on the vehicle. The wax does not relieve the surface tension of the water and thus does not make sufficiently close contact with the surface of the vehicle, which diminishes the efficiency of the wax. Separate steps for applying wax complicate the washing programme and make the washing operation rather long.

OBJECTS AND SUMMARY

An object of the present invention is to provide a method and an apparatus for washing vehicles both rapidly and efficiently.

The method of the invention is characterized in that wax is applied at a high pressure to the surface of the vehicle during the high-pressure washing.

The apparatus of the invention is characterized in that it comprises means for supplying wax by the nozzles at a high pressure to the surface of the vehicle during the high-pressure washing.

An idea of the invention is that the wax to be used in the washing is applied to the surface of the vehicle at a high pressure. The idea of a preferred embodiment is that the wax is applied to the surface of the vehicle simultaneously with high-pressure washing. The idea of a particularly preferred embodiment is that the wax is applied at a high pressure with oscillating point jets.

An advantage of the invention is that applying wax at a high pressure surprisingly improves the drying result. In addition, wax applied at a high pressure adheres to the surface of the vehicle efficiently. As wax is applied during high-pressure washing, a separate step for applying wax is not needed, which simplifies and speeds up the washing programme. When wax is applied at a high pressure, the number of applications can be limited to one, and still the drying and protection result obtained is extremely good. By using a point-like jet for applying the wax it is ensured that the wax has a sufficiently high pressure when it hits the vehicle surface.

BRIEF DESCRIPTION OF THE DRAWINGS

In the following, the invention will be described in greater detail with reference to the accompanying drawings, in which.

DETAILED DESCRIPTION OF THE PREFERRED EMBODIMENTS

Figure 1:
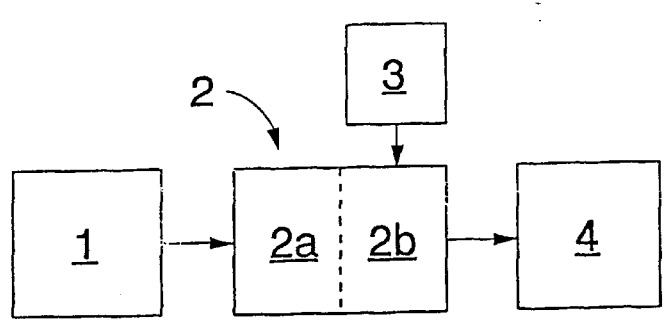
FIG. 1 is a schematic view of the different vehicle washing steps of the invention.

FIG. 1 is a schematic illustration of a vehicle washing operation of the invention. Step 1 comprises preliminary washing of a vehicle in a manner fully known per se. In step 2, the vehicle is washed with a high-pressure water jet. In this step, wax is mixed with the high-pressure water, as indicated by reference number 3 in FIG. 1. Wax is thus applied to the vehicle at a high pressure, and a separate step for applying wax is not required. To optimize the use of wax, it is not necessary to add wax at the beginning 2a of the high-pressure washing. At the end 2b of the high-pressure washing, wax is mixed with the high-pressure water. At the beginning 2a of the high-pressure washing, the detergent used in the preliminary washing is efficiently rinsed off the vehicle surface. In step 4, the vehicle is dried in a manner fully known per se. The washing may naturally also comprise other steps known per se; the particular advantage of the invention is that the wax is applied during the high-pressure washing 2, and that no other steps are needed for applying the wax.

Figure 2:
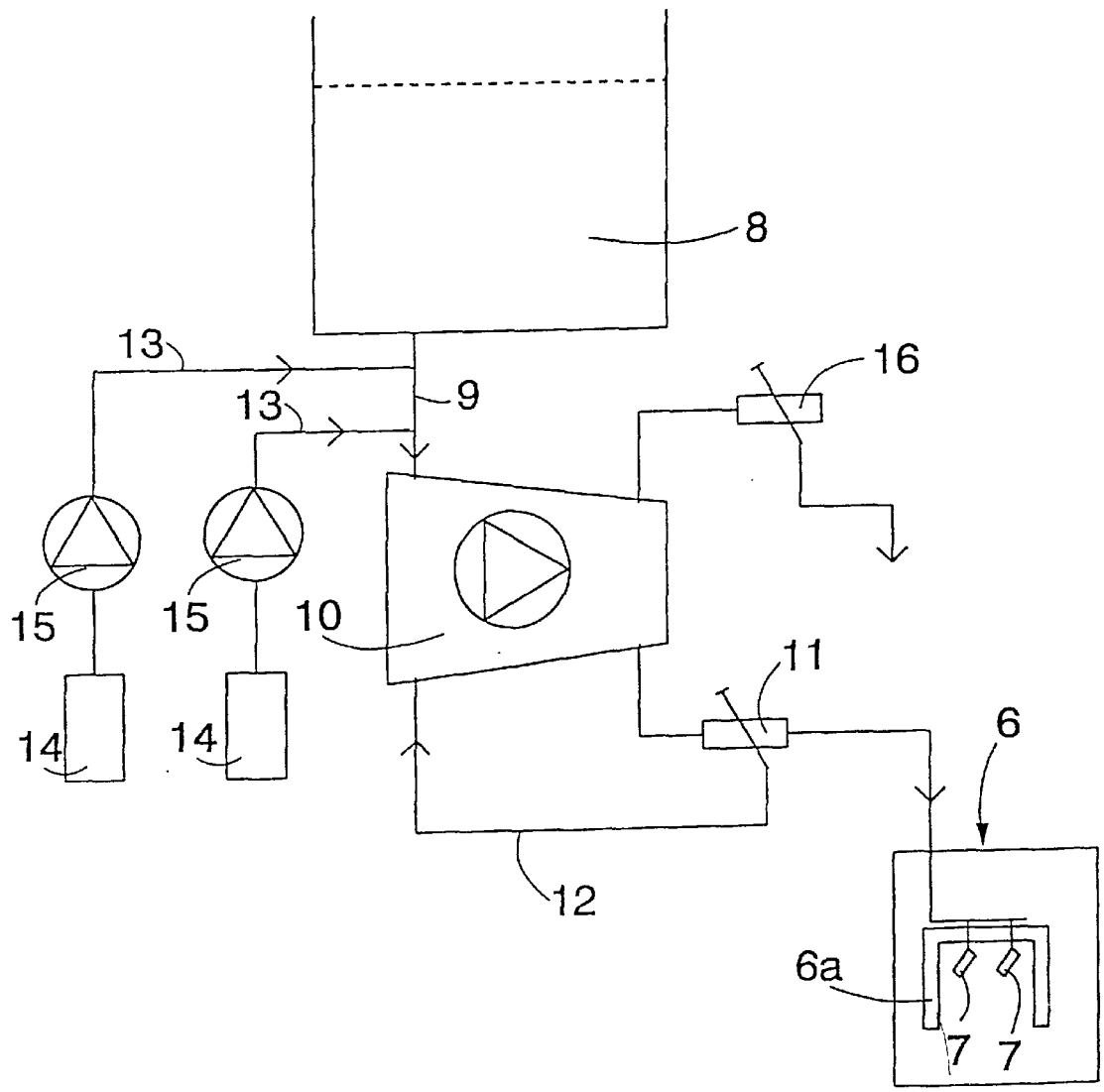
FIG. 2 is a schematic view of a vehicle washing apparatus of the invention.

FIG. 2 is a schematic illustration of a washing apparatus of the invention. The washing apparatus comprises a washing device 6 with a frame 6a. The frame 6a may be arranged to move in the longitudinal direction of the vehicle to be washed, for example on rails. Alternatively, the frame 6a may be stationary, in which case the vehicle is arranged to move in relation to the frame 6a. The frame 6a is provided with spray nozzles 7 for producing a water jet with which the vehicle is washed. In a manner fully known per se, nozzles 7 are provided for the roof, sides, and optionally the bottom of the vehicle, as required. The nozzle supports and other structures connected to the washing device 6 and their movement are fully known per se and will therefore not be discussed in greater detail herein.

The water to be supplied to the washing device 6 is stored in an intermediate tank 8. The water supply pipes, valves and liquid level regulating means connected to the intermediate tank 8 are self-evident to one skilled in the art and therefore not shown in FIG. 2. From the intermediate tank 8, the water is supplied through a supply pipe 9 to the low-pressure section of a high-pressure pump 10. The high-pressure pump 10 increases the pressure of the water, whereafter the high-pressure water is supplied to the nozzles 7. The pressure of the water is regulated by a pressure regulator 11. The pressure regulator 11 regulates the pressure by supplying the water that has the correct pressure to the nozzles 7 and by supplying excess water to a circulating pipe 12. The circulating pipe 12 is connected back to the low-pressure section of the high-pressure pump 10 so that water containing wax, for example, is not mixed with the pure water in the intermediate tank 8. Wax is supplied to the water supply pipe 9 from a wax container 14 through a wax supply pipe 13. The supply and amount of wax are controlled by a wax supply pump 15, for instance by adjusting the power supply frequency of the motor of the wax supply pump 15 or in some other manner fully known per se. There may be one, two or more wax containers 14 and arrangements for supplying wax from them, whereby different kinds of wax, such as hot wax, rinsing aid or rinsing wax, can be supplied to the apparatus from the different wax containers 14. The supply of wax can naturally be controlled by supplying the wax only in the desired step. It is not necessary to supply the wax to all the nozzles, but it may be sufficient to supply it only to the roof nozzles, for example. The high-pressure section of the high pressure pump 10 is also provided with an overpressure valve 16, which prevents the pressure in the high-pressure pump 10 from becoming too high. For reasons of clarity, the valves and other devices, such as pressure gauges, connected to the piping of the apparatus are not shown in FIG. 2. In order for the desired effect to be achieved, the pressure of the wax in the spray nozzles 7 should preferably be over 25 bar. Typically the pressure is 60 bar. The nozzles are preferably oscillating point jet nozzles, which produce a point-like jet whose pressure is still sufficiently high on the surface of the vehicle. In addition, the nozzles oscillate in such a way that they clean the vehicle surface over a sufficiently long distance.

The drawings and the description relating thereto are intended merely to illustrate the inventive concept. In its details, the invention may be modified within the scope of the appended claims.

We claim:

1. A method for washing vehicles, said method comprising washing a vehicle with an apparatus comprising a frame; moving said frame and the vehicle to be washed in relation to each other in a longitudinal direction of the vehicle; using a high-pressure pump having a low-pressure section and a high-pressure section to supply water at a high pressure, and the high-pressure pump is provided with a pressure regulator to which a circulating pipe is connected for circulating excess water back to the low-pressure section of the high-pressure pump; washing the vehicle with a high pressure water jet from the high-pressure section of the pump; waxing the vehicle; and drying the vehicle, whereby wax is applied at a high pressure to a surface of the vehicle during the high-pressure-washing and wherein the excess water is water that is not directed through the water jet for washing the vehicle.

2. A method according to claim 1, wherein the wax is applied to the surface of the vehicle at an end of the high-pressure washing.

3. A method according to claim 1, wherein the pressure at which the wax is applied is over 25 bar.

4. A method according to claim 1, wherein the wax is applied by an oscillating point jet.

5. An apparatus for washing vehicles, said apparatus comprising a frame, said frame and the vehicle to be washed being arranged to move in relation to each other in a longitudinal direction of the vehicle; spray nozzles arranged to spray high-pressure water for washing the vehicle; means for supplying wax by the nozzles at a high pressure to a surface of the vehicle during the high-pressure washing;

a high-pressure pump for supplying water at a high pressure to the nozzles; and a wax supply pump for supplying wax from a wax container to a low-pressure section of the high-pressure pump;

wherein a high-pressure section of the high-pressure pump is provided with a pressure regulator to which a circulating pipe is connected for circulating excess water back to the low-pressure section of the high-pressure pump and wherein the excess water is water that is not directed through the spray nozzles.

6. An apparatus according to claim 5, wherein the nozzles are oscillating point jet nozzles.

\* \* \* \* \*